Feb. 7, 1933.                    D. M. SCOTT                    1,896,789
                        APPARATUS FOR REDUCING CHROME ORES
                        Filed April 20, 1931        2 Sheets-Sheet 1
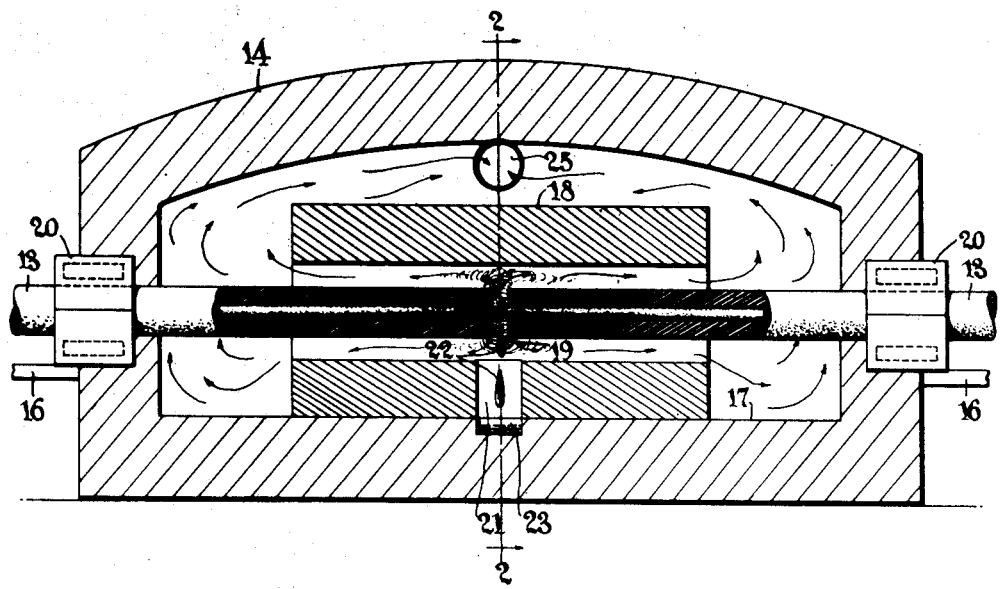
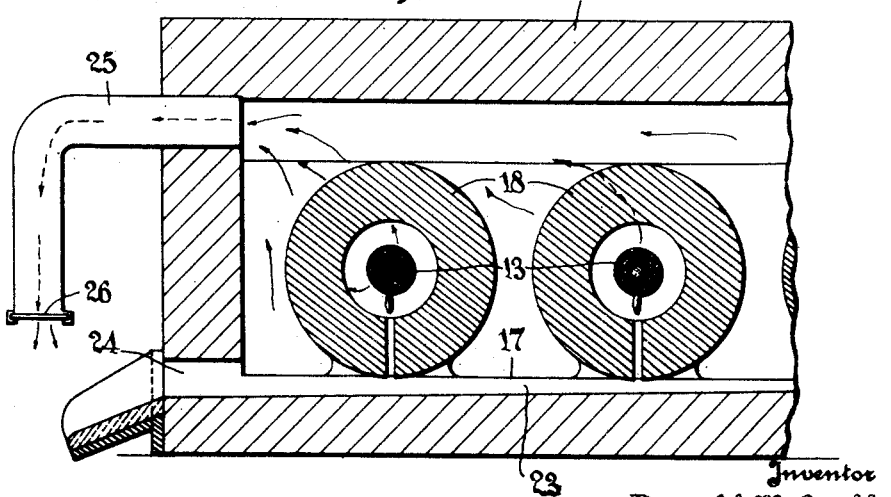
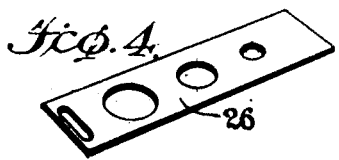
Inventor
Donald M. Scott,
By Bean, Brooks + Henry.
Attorneys

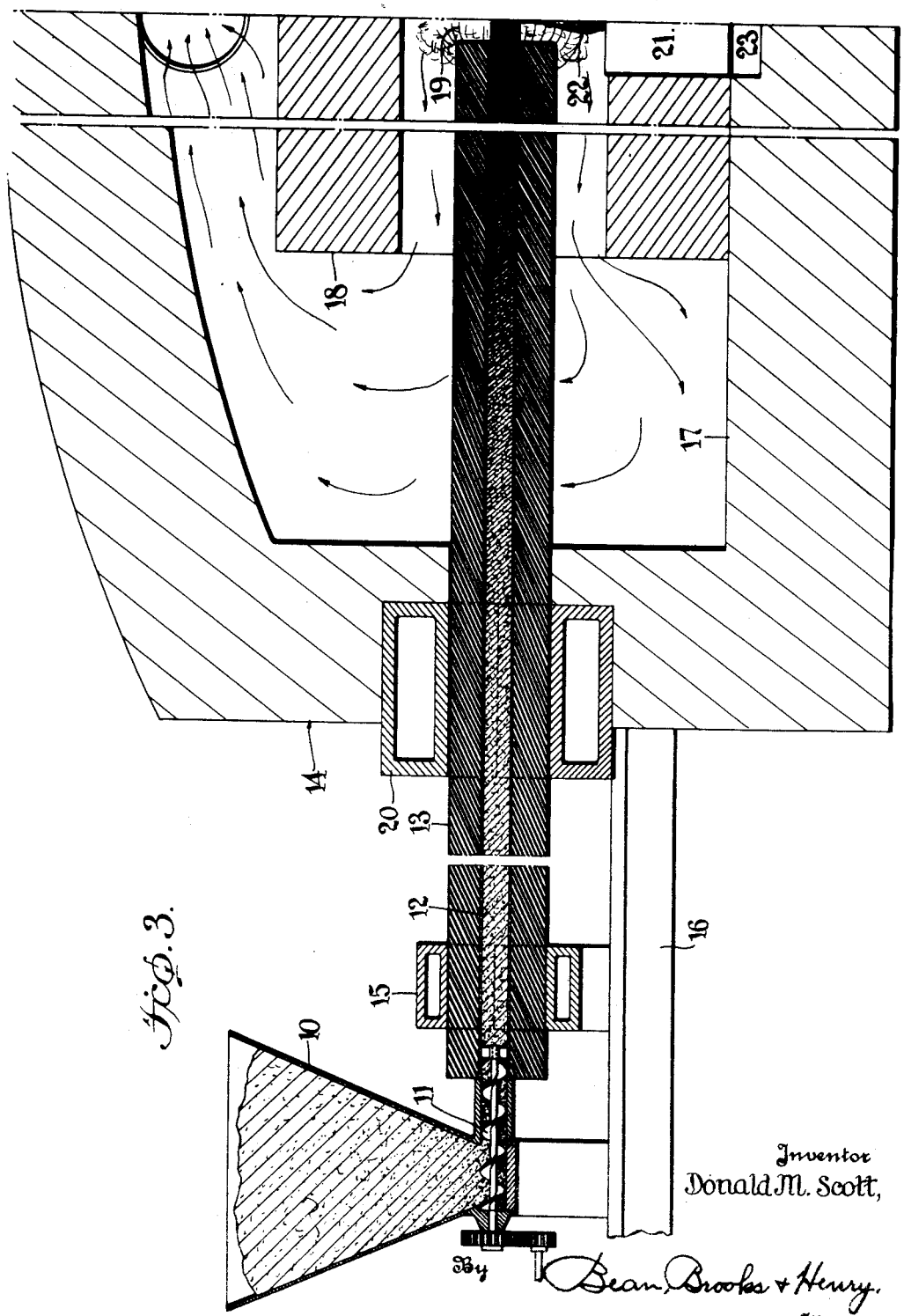

Patented Feb. 7, 1933

1,896,789

UNITED STATES PATENT OFFICE

DONALD M. SCOTT, OF BUFFALO, NEW YORK, ASSIGNOR TO BUFFALO ELECTRIC FURNACE CORPORATION, OF BUFFALO, NEW YORK

APPARATUS FOR REDUCING CHROME ORES

Application filed April 20, 1931. Serial No. 531,560.

This invention relates to reduction of metallic ores, such as iron and chromium ores, directly by an electrical method producing ferro chromium of high quality.

In a prior and copending application, Wiles, Serial No. 374,251 filed June 27, 1929, there is disclosed a method of effecting the electrothermic reduction of ores or the making of alloys, in which a homogeneously mixed charge of ore, flux and reducing agent is forced progressively through a hollow conduit into an electric arc, reduction being obtained within the conduit or electrode.

In applying the stated invention to the reduction of chrome ores for the purpose of making ferro chromium or ferrous metal of a relatively high chromium content, I find it is advantageous to so condition the charge as to insure positive contact in the solid phase between the particles of chromium and the reducing agent. And I have further found that certain improvements in the control of the reduction may be effected by so admixing the charging materials that they form a substantially solid mass.

In the actual conduct of the process, I find it advantageous to employ a furnace having one or more pairs of juxtaposed and horizontally disposed hollow electrodes and for the reduction of chromium, I find good practical results are obtained by using an electrode having a bore of one and three-eighths inches. I preferentially employ a mechanical feeding device, such as a screw feeding machine, for the feeding of the charge, and direct the charge into the relatively cold end of the electrode where sufficient temperature obtains to effect a slight baking, holding the charge together as a substantially solid mass. The charge in the form of a core of slightly less diameter than that of the bore of the electrode is then progressively forced into the hotter portions of the conduit where the temperature is increased and the desired reaction is obtained. The rate of feeding is such that reduction is effected within the electrode, and the molten metal and slag are discharged through the arc into the hearth beneath.

As pointed out in the stated copending application, suitable adjustment should be provided in the apparatus for effecting adjustments of the electrodes, but it is to be understood that the electrodes and charge to be reduced are relatively movable so that the charge passes through the electrode and in so moving is not reduced at its expense.

For the charge I have found it advantageous to use a mix of the following composition:

| | |
|---|---|
| Chrome ore | 250 lbs. |
| Lime | 135 lbs. |
| Dry pitch | 65 lbs. |
| Sand | 55 lbs. |
| Fuel oil | 6 gals. |
| Sodium silicate | 10 lbs. |

I have also found other mixes give good adherent cores and I have used the following mixture:

| | |
|---|---|
| Chrome ore | 250 lbs. |
| Lime | 20 lbs. |
| Dry pitch | 80 lbs. |
| Calcium fluoride | 7 lbs. |
| Fuel oil | 4 gals. |
| Water | 4 gals. |
| Caustic soda | 10 lbs. |

The ore includes chromium oxide, iron oxide, alumina, etc., and is advantageously a high chromium ore, such as chromite or other chromium containing ore. I may mention that I have successfully reduced ores of the following composition, sesqui-oxide of chromium 51.28%, protoxide of iron 14.66%, silica 3.24%, magnesia 9.43%, lime 1.72%, alumina 14.36%. If the iron content is lower than that desired to yield the alloy contemplated, additional quantities of iron oxide may be included in the mix. The lime and sand are employed for the fluxing elements of the charge while the sodium silicate acts as a binder, or it may be omitted for such practical work. The dry pitch contains a high percentage of carbon and acts not only as a binder, but also as a reducing agent. I find that the use of the fuel oil is extremely desirable as it contributes a certain amount of carbon effective as a reducing agent, and also is highly advantageous because of its lubricating qualities. These ingredients are mixed together with sufficient water to form a plastic mass which may be preformed into cores of desired length in an article extruding device.

Preformed cores may be baked at a low temperature to drive off contained water and such baked cores are quite strong and may be fed through the electrodes in any desired manner, such as by hand.

In another way of working, the extruding device is positioned adjacent the cold end of the electrode and is coupled to a pipe or tube projecting into the bore of the electrode to a point at which it is not affected by the temperature there occurring. The plastic material is then forced directly into this pipe and by the time it reaches the reduction zone within the electrode, it has been subjected to a temperature sufficient to hold the particles in the desired relationship.

Reduction is effected in the hotter portions of the electrode and the rate of feeding is so adjusted as to insure reduction of the chromium and iron in this zone. Due to the intermixture of the fine particles of chromium oxide, iron oxide, reducing agent, and flux, reaction progresses quickly and with a high degree of efficiency.

For operating the process to make a ferro chromium containing 49% chromium, and 3.3% carbon, I have employed an apparatus such as is shown in the appended drawings, wherein:

Fig. 1 represents a sectional view through the furnace.

Fig. 2 is a section along line 2—2 of Fig. 1.

Fig. 3 is an enlarged longitudinal fragmentary section through one type of forming machine and electrode, and Fig. 4 is a perspective view of a type of damper used on the gas downcomer.

The prepared mix of ore, binder and reducing agent is fed in any desired manner to the hopper 10 and is caused to move under the influence and impulse of the continuous screw feeding device 11 into a molding tube 12 which extends from the hopper and into the electrode. This mold or sleeve may be suitably prepared from metal, although other substances may be used, and under certain conditions of working, may be good conductors of heat; for instance in those cases where metallic casings are used, while in others, the casing may be made from a material which is not an exceptionally good conductor of heat.

During the passage of the plastic mass through this mold or casing, the mass is packed so that a close coherent and adherent charge is produced which is continuously propelled into and through the tube 12.

This mold or casing extends a considerable distance into an electrode 13 of an electric furnace 14, one half of which is shown in Fig. 3, the other half being practically identical with the showing therein. The companion electrode may be hollow or of the solid type. The electrode is preferably a graphite electrode of hollow construction, such as is mentioned in a copending application as stated hereinabove. The electrode is suitably provided with a cooling device 15 which clamps the feed end of the electrode and is adapted to move upon a track 16 whereby the electrode is moved into or out of the furnace.

Another water cooler 20 surrounds the electrode and is embedded into the wall of the furnace a substantial distance; I have used such a cooler with my apparatus extending into the furnace wall to an extent equal to at least two thirds the thickness thereof for reasons which will be hereinafter more fully explained.

Since the mold or casing member 12 extends into one end of the electrode, the plastic material in the casing is heated and the binding material carburized, whereby a hard coherent core is produced which is gradually propelled through the electrode. Since the core is smaller than the bore of the electrode, the gaseous products produced during the baking discharge into the electrode around the core and act as reducing agents as the gases travel with the core and discharge into the electric arc at the end of the electrode. As the core progresses into and through the electrode, its temperature is gradually increased until a point is reached at which chemical changes are initiated. The intimate contact of ore, flux and reducing agent apparently creates substantially ideal conditions for the reduction of the ore with the production of the metallic product, slag and gaseous products of the chemical reactions. As the core approaches the discharge end of the electrode, the materials are changed to a pasty mass of partially reduced and slagged material, and are ejected into an electric arc formed between the electrode 13 and its companion, are melted therein, and fall from the electrode as molten metal and molten slag.

My purpose is to provide an extremely hot reducing zone, and to this end, enclose the electric arc within a confined space. Thus, as in Fig. 1, the electrodes 13 extend into a confining and muffling device 18 which is advantageously made of graphite. The muffle is in the form of a sleeve which is adapted to cover the ends of the electrode and to cause the heat of the electric arc between the juxtaposed electrodes to be locally confined, thereby producing a reducing zone of extreme temperature and at the same time affording protection and insulation for the furnace walls and roof.

In the furnace which I have used for effecting the reduction of chrome ore, I have provided muffles of carbon with an outside diameter of 24″ and an inside diameter of 11¼″, thus allowing the formation of a reducing zone within the muffle and around the electrodes and the arc formed therebetween. As the core of chrome ore moves from the feeding end of the electrode to the discharge end thereof, the carbonaceous material therein contained is distilled into the interior passage of the electrode and discharged into the electric arc 19, thereby maintaining an extremely active reducing zone in the muffle and arc as such carbonaceous products, it is believed, are there changed to what has been termed the nascent state. These active reducing constituents insure the completion of the reduction of the oxides of metal which have been partially reduced during their passage through the electrode wherein they have been in intimate contact with solid reducing agents, and wherein a progressive temperature increase has been maintained. It is thought that the reduction is effected mainly in the solid state due to the intimate contact of the chemical reactants and is incidentally aided by the envelope of reducing gas.

As the hot gases are ejected from the muffle 18, they impinge upon the feed end of the electrode, transferring heat thereto, and maintaining the temperature of the electrode for causing reducing actions therein, and finally impinge upon the walls of the furnace immediately adjacent the electrode. The walls of the furnace, at this point, therefore, are subjected to the greatest temperature, and it is therefore necessary to use cooling means, such as the water cooler 20, to prevent melting and slagging of the furnace walls.

I have found it advantageous to embed the water coolers to a substantial extent in the furnace walls as it is at this point that the walls are subjected to the greatest temperature and where the slagging tendency is a maximum.

The carbon muffles are provided with a slot 21 in the bottom portion thereof, which slot underlies the electric arc formed between the ends of the electrode 13, the provision of this slot insuring a minimum of contamination of the molten metal with solid carbon or carbonaceous material, thereby producing high grade ferrous alloys containing minimal carbon contents. Thus, molten metal 22 falls from the ends of the electrodes 13 through the slot 21 of the muffle into a trough 23 formed in the hearth 17 of the furnace, which trough leads to and advantageously slopes toward the tap hole or discharge 24 of the furnace.

I have also found it advantageous to permit the molten metal to discharge from the furnace so fast as reduction occurs, collecting such metal in appropriate ladles which may be heated externally or if so desired, transferring the metal to an auxiliary furnace wherein it may be subjected to a final refining process.

The metal is at all times in contact with reducing gases since a portion of such gases flow through the slot 21 and from thence follows the metal through the trough 23 and exits at the tap or spout where they are burned or may be collected.

A draw-off 25 is provided in some portion of the furnace adjacent the top thereof, such as a position overlying the spout whereby the reducing gases may be more readily used for maintaining the temperature of the ladle or pot in which the molten metal is collected.

The draw-off is provided with suitable valving means, such as the damper 26, for restricting the emission of gas and thereby regulating the gaseous pressure within the furnace to a pressure slightly above atmospheric to prevent inadvertent entrance of air into the furnace with the possibility of producing oxidizing conditions therein.

It will thus be seen that the method comprises an intimate contact of ore, reducing agent, and flux in the solid phase, passing the charge through a zone of progressively increasing temperature whereby chemical action is initiated, and melting the reduced material in an electric arc whereby the molten metal may be separated from the slag formed in the process.

Although the specific example set out above relates to ores containing chromium, the fundamentals of the process can be efficaciously applied to the reduction of any metallic ore of the type which requires contact of solid reducing agent with solid ore for its reduction, in contra-distinction to those ores wherein reduction may be consummated by gaseous reducing agents such as carbon monoxide. An example of the latter case is the reduction of iron oxide in the blast furnace wherein the work of reduction is caused by a gaseous reducing agent and not by contact of solid ore with solid reducing agent.

What is claimed:

1. A furnace for the electrothermic reduction of ore which comprises an enveloping furnace structure, hollow juxtaposed electrodes extending into said structure, and a heat resistant sleeve enclosing the ends of said juxtaposed electrodes having communication with the hearth of said furnace through the lower portion thereof.

2. A furnace for the electrothermic reduction of ore which comprises an enveloping furnace structure, hollow juxtaposed electrodes extending into said structure, and a muffle enclosing the ends of said juxtaposed electrodes for confining the heat to the ends thereof and for directing discharged gas along said electrodes.

3. A furnace for the electrothermic reduction of ore which comprises an enveloping furnace structure, a plurality of hollow juxtaposed electrodes extending into said structure and muffles enclosing the ends of the juxtaposed electrodes and having slots therein communicating with the hearth of said structure.

DONALD M. SCOTT.